(No Model.) 2 Sheets—Sheet 1.

L. STOCKWELL.
BED PAN.

No. 466,449. Patented Jan. 5, 1892.

Witnesses:
F. G. Fischer
Jno. L. Condon.

Inventor:
Lydia Stockwell.
By Higdon & Higdon
Attys.

(No Model.) 2 Sheets—Sheet 2.

L. STOCKWELL.
BED PAN.

No. 466,449. Patented Jan. 5, 1892.

Witnesses:
F. G. Fischer
Jno. L. Condon

Inventor:
Lydia Stockwell.
By Higdon & Higdon
Attys.

UNITED STATES PATENT OFFICE.

LYDIA STOCKWELL, OF ATCHISON, KANSAS.

BED-PAN.

SPECIFICATION forming part of Letters Patent No. 466,449, dated January 5, 1892.

Application filed June 23, 1891. Serial No. 397,233. (No model.)

*To all whom it may concern:*

Be it known that I, LYDIA STOCKWELL, of Atchison, Atchison county, Kansas, have invented certain new and useful Improvements in Bed-Pans, of which the following is a full, clear, and exact description, reference being had to the accompanying drawings, forming a part hereof.

My invention relates to that class of appliances which are used to receive the excreti of bed-ridden persons, who are therefore unable to assume a natural posture while complying with the demands of nature; and the objects of my invention are to produce a simple, durable, and inexpensive form of bed-pan which shall be easy and convenient to use, which will always retain its proper position beneath the user's person, and which will not be liable to slip from beneath the user's person during use.

A further object of my invention is to provide means for preventing chilling of the user's body and the escape of unpleasant odors from the pan.

To the above purposes my invention consists in certain peculiar and novel features of construction and arrangement, as hereinafter described and claimed.

In order that my invention may be fully understood, I will proceed to describe it, with reference to the accompanying drawings, in which—

Figure 1:
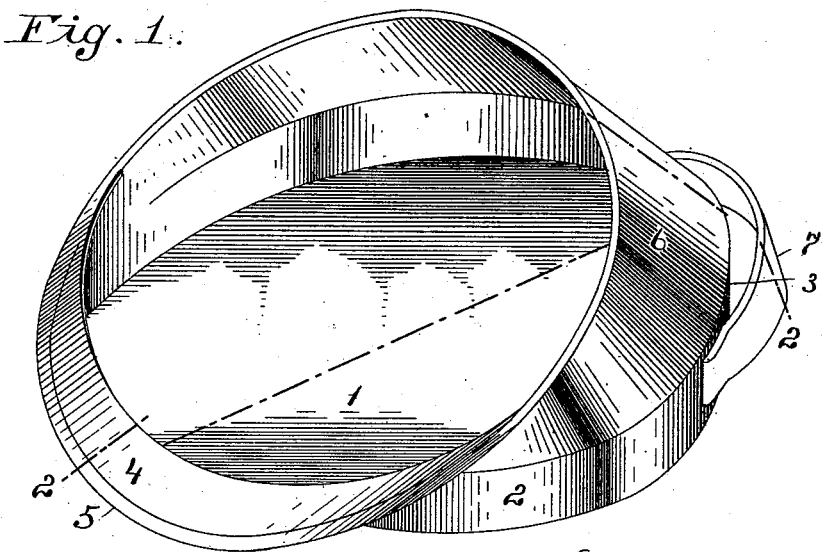
Figure 2:
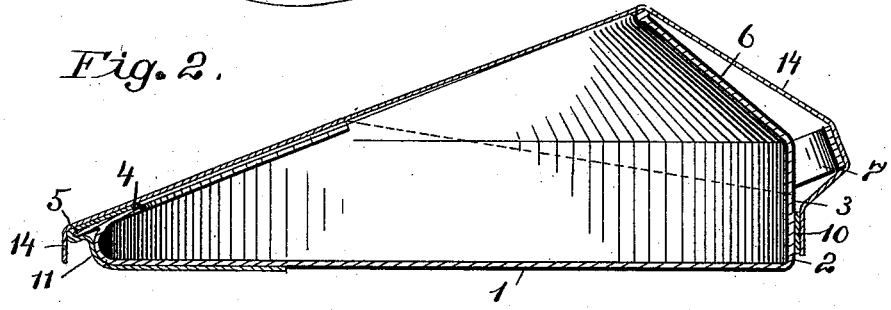
Figure 3:
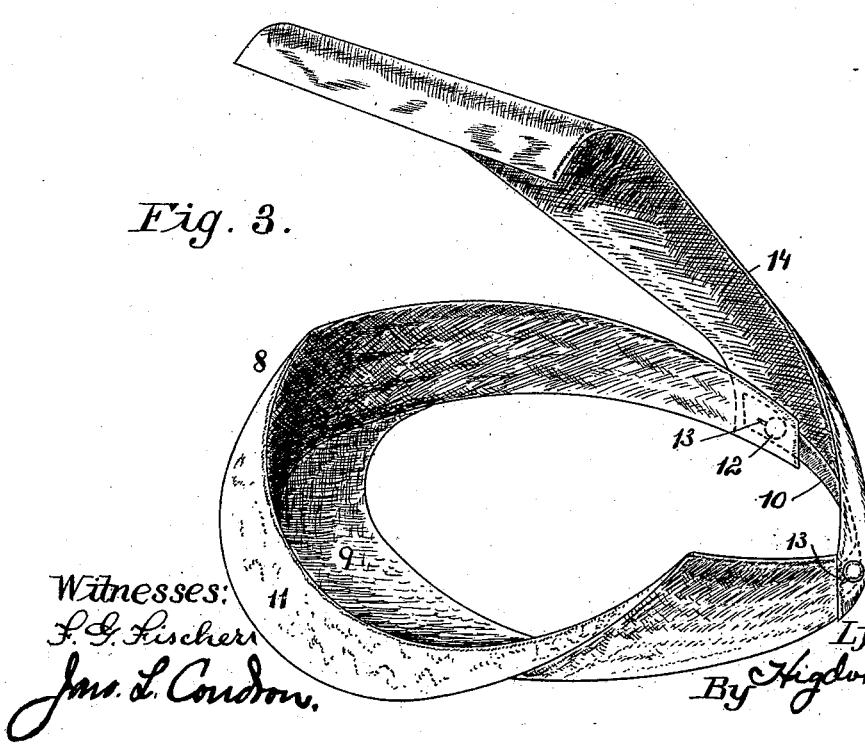
Figure 4:
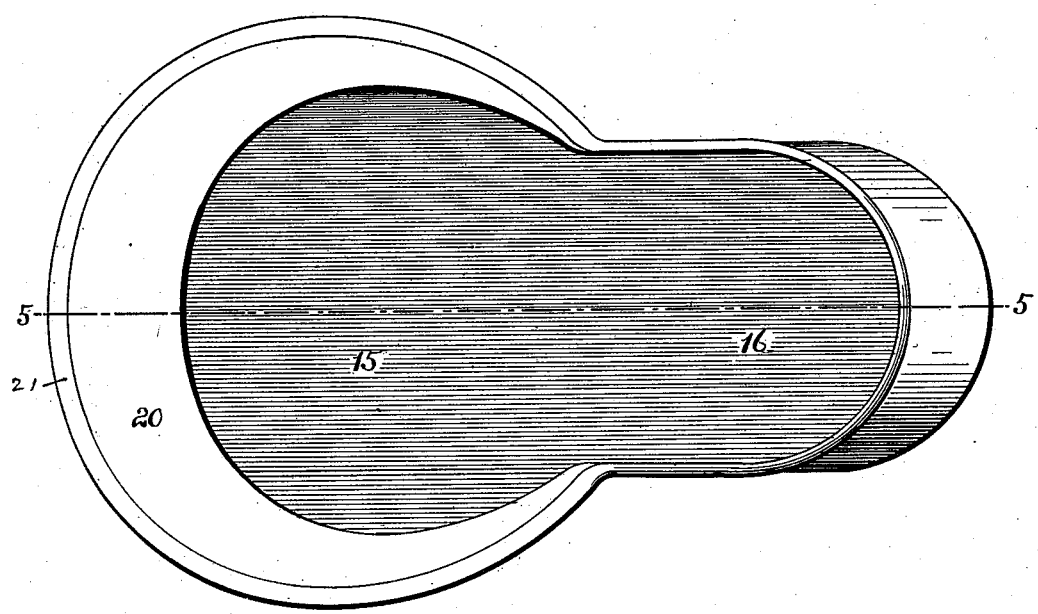
Figure 5:
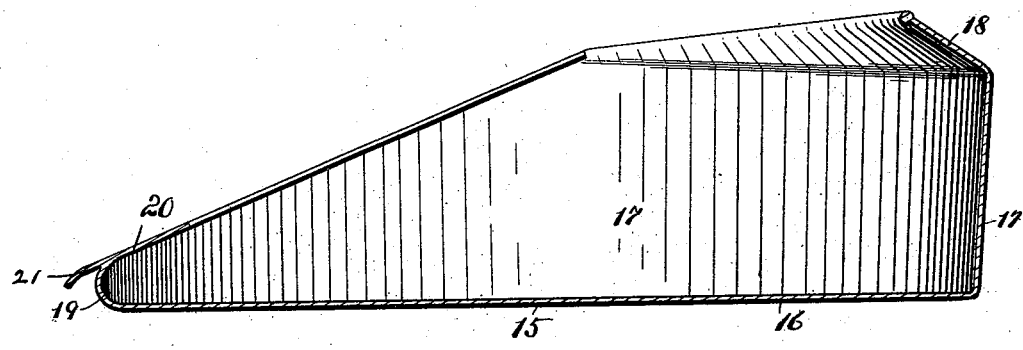

Figure 1 is a perspective view of a bed-pan constructed in accordance with my invention, the said pan being particularly designed for use by a person lying upon his side. Fig. 2 is a vertical longitudinal section of the same on the line 2 2 of Fig. 1. Fig. 3 is a detached perspective view of a fabric covering or shield to be used in connection with the pan shown in Figs. 1 and 2. Fig. 4 is a plan view of a modified form of my improved bed-pan, the construction of this pan being such as to adapt it peculiarly for use by a person lying upon his back. Fig. 5 is a vertical longitudinal section of the same on the line 5 5 of Fig. 4.

Referring first to Figs. 1 and 2, 1 designates the bottom of the pan, the said bottom being of oval form and the longer axis of the bottom extending from front to rear of the pan. At its margin this bottom is provided with a vertical side portion 2, which extends completely around the pan from front to rear thereof, and the rear portion, of which is of greater height than its front portion. This continuous side portion 2 extends upwardly at right angles to the plane of the bottom of the pan and to the outer surface of the rear of said side portion is riveted or otherwise formed or secured a segmental-shaped handle 7. 6 designates an extension of the side portion 2, this extension being of segmental form, and at its rear portion extending obliquely upward and forward from the side portion of the pan. The line of juncture of the lower part of the extension 6 with the upper part of the side portion 2 is sharply defined and is on a substantially horizontal plane, and is, furthermore, of segmental contour, extending throughout the back and sides of the pan and terminating at each side of the center of the front of the pan, as is clearly shown in Fig. 1. The upper margin of the extension 6 is of segmental form and extends obliquely forward and downward in a continuous line, and at its front ends or termini is united to the rear ends of a crescent-shaped portion 4. This crescent portion 4 extends inward and rearward and also upward and rearward transversely, its outer margin projecting outward from the front of the pan, so as to form a lip or flange 5, as shown. It will be seen that the upper surface of this crescent-shaped portion 4 constitutes a linear continuation of the marginal front line of the extension 6, above described. It is to be observed that by virtue of the construction described the opening at the front upper part of the pan is of such shape as to properly receive the posterior portion of the body of a person lying upon his side, and that there are no marked protuberances or depressions in the marginal lines of said opening.

Referring now to Figs. 4 and 5, I will describe the construction of the pan, which embraces, essentially, the same structural features as that above described, but which is somewhat modified in order to adapt the pan for the use of persons who are compelled to lie prone upon their backs. In this instance the bottom 15 is of oval form, similarly to the bottom 1 of the pan before described, the longer axis of the bottom 15 likewise extending from front to rear of the pan. This bottom 15 is formed with a rearward extension 16, which is of less width than that of the front portion 15. The side portion 17 of the pan extends upward at right angles from the bottom 15 and its extension 16, and is of greater height at its rear and gradually diminishes in height toward its front portion 19, the upper front margin of the side portion thus being inclined gradually downward and forward in a straight plane, as shown. A segmental extension 18, corresponding to the extension 6, before described, inclines upwardly and forwardly from the rear part of the side portion 17, its line of demarkation from the upper part of the side portion being clearly defined, and its upper margin being inclined forwardly and downwardly, as shown. A crescent-shaped portion 20, corresponding to the crescent-shaped portion 4, previously described, extends rearwardly and inwardly and also obliquely upward and rearward transversely, and the rear ends of the said crescent-shaped portion unite with the front ends or termini of the margin of extension 18. At its front margin this crescent-shaped portion 20 projects beyond the front of the pan in the form of a lip or flange 21.

It will thus be seen that the opening in the top of this pan is of such form as to properly receive the posterior portion of the body of a person lying upon his side, and that, like the pan previously described, there are no marked protuberances or depressions in the margin of the opening.

In order to prevent the user's body from being chilled by contact with the pan, I provide a covering or shield 8, of flannel or any other suitable soft and warm fabric. This covering or shield is composed of a body portion 9, of approximately segmental form, and the ends of said body portion are connected by a suitable elastic strip 10. An additional piece 11, of approximately segmental form also, is stitched to the body portion 9, and when this covering or shield is to be used the body portion 9 is placed upon the front edge of the pan, so as to overlie the crescent-shaped portion of the pan shown in Figs. 1 and 2. The additional piece 11 of the cover extends beneath the lip or flange 5 and front portion of said pan, and the entire cover or shield is retained in position by the elastic straps which embrace the back of the sides 2. A pair of buttons 12 are sewed upon the ends of the portion 9 of the cover or shield, and these buttons are designed to be inserted into two button-holes 13 of a rectangular flap or shield 14 of oil-cloth or similar material, said flap being laid over the opening of the pan after said pan has been used, and thus preventing the escape of unpleasant odors from the pan.

It is to be understood that the pans above described may be made either of suitable sheet metal, (which may be marbleized or otherwise surfaced,) or said pans may be made of porcelain, granite-ware, crockery, or any other suitable or preferred material. The pans are designed to be used in sets, and the form of the pans is such that the pressure of the user's person upon the pan keeps the latter from tipping and also from slipping out from beneath the user's person. The pan shown in Figs. 4 and 5 is particularly serviceable in cases of fractured limbs, and also permits the ready administration of enemas to the patient. It is impossible for either pan to be forced too far beneath the user's person, owing to the peculiar form of the pan, and the pan is also simple, durable, and inexpensive in construction.

Having thus described my invention, what I claim as new therein, and desire to secure by Letters Patent, is—

1. An improved bed-pan comprising a bottom of oval form, having its longer axis extending forward and rearward of the pan, a side portion extending upward at right angles from the margin of the bottom and of greater height at its rear portion and gradually diminishing in height from its rear to its front portion, a segmental extension extending upwardly and forwardly from the top of the rear part of the side portions and having its upper margin inclined forwardly and downwardly, and a crescent-shaped portion extending upwardly and rearwardly from the front of the pan and terminating at its rear ends coincidently with the front ends of the extension, and also projecting at the front of the pan to form a lip or flange, substantially as set forth.

2. An improved bed-pan comprising a bottom of oval form, having its longer axis extending forward and rearward of the pan and provided with a rearward extension of less width than the bottom, a side portion extending upward at right angles from the margins of the bottom and its extension and of greater height at its rear portion and gradually diminishing in height to its front portion, a segmental extension extending upwardly and forwardly from the top of the rear part of the side portion and having its upper margin inclined forwardly and downwardly, and a crescent-shaped portion extending upwardly and rearwardly from the front of the pan and terminating at its rear ends coincidently with the front ends of the extension, and also projecting at the front part of the pan to form a lip or flange, substantially as set forth.

3. An improved attachment for bed-pans of the type described, consisting of a fabric covering or shield comprising a segmental body-piece, elongated side pieces having buttons at their rear extremities, an elastic piece connecting said ends, a segmental piece attached to the front lower margin of the side pieces, and a flap connected to the buttons and arranged to cover the top of the pan, substantially as set forth.

In testimony whereof I affix my signature in presence of two witnesses.

LYDIA STOCKWELL.

Witnesses:
H. E. PRICE,
JNO. L. CONDRON.